(No Model.)

L. E. MILNER & D. A. BECK.
NUT LOCK.

No. 585,773. Patented July 6, 1897.

Witnesses
H. S. Dieterich
J. F. F. Riley

Inventors
Lewis E. Milner
Daniel A. Beck
By their Attorneys,
C. A. Snow & Co.

UNITED STATES PATENT OFFICE.

LEWIS E. MILNER AND DANIEL A. BECK, OF JOHNSONBURG, PENNSYLVANIA.

NUT-LOCK.

SPECIFICATION forming part of Letters Patent No. 585,773, dated July 6, 1897.

Application filed February 15, 1897. Serial No. 623,550. (No model.)

*To all whom it may concern:*

Be it known that we, LEWIS E. MILNER and DANIEL A. BECK, citizens of the United States, residing at Johnsonburg, in the county of Elk and State of Pennsylvania, have invented a new and useful Nut-Lock, of which the following is a specification.

The invention relates to improvements in nut-locks.

The object of the present invention is to improve the construction of nut-locks and to provide a simple, inexpensive, and efficient device adapted for use on railroads, bridges, machinery, and other constructions subject to vibrations and capable of securely locking a nut against accidental unscrewing and of permitting a nut to be readily removed when desired without injuring the device.

The invention consists in the construction and novel combination and arrangement of parts as hereinafter described, illustrated in the accompanying drawings, and pointed out in the claim hereto appended.

Figure 1:
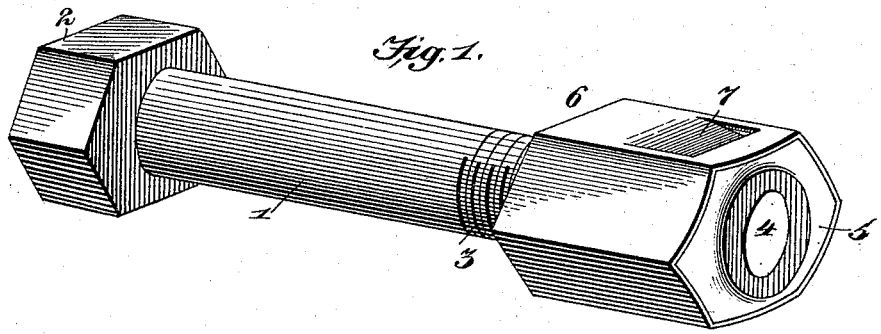
Figure 2:
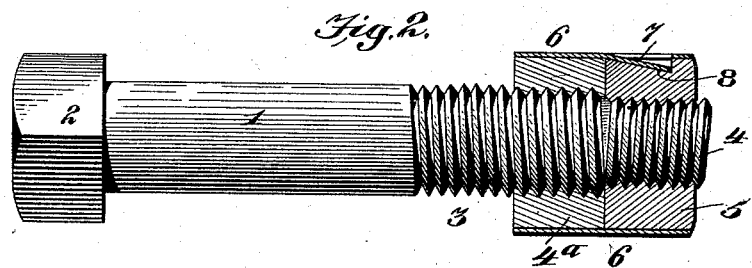
Figure 3:
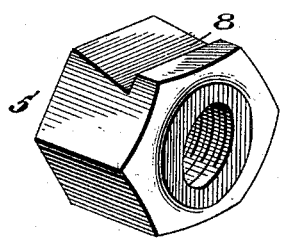
Figure 4:
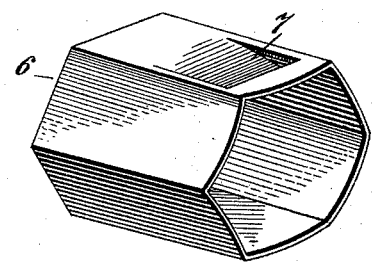

In the drawings, Figure 1 is a perspective view of a nut-lock constructed in accordance with this invention. Fig. 2 is a longitudinal sectional view of the same, the bolt being shown in elevation. Fig. 3 is a detail perspective view of the outer nut. Fig. 4 is a similar view of the locking-sleeve.

Like numerals of reference designate corresponding parts in the several figures of the drawings.

1 designates a bolt provided at one end with a head 2 and having its other portion or end threaded, and this threaded portion of the bolt is provided with inner right-hand screw-threads 3 and outer left-hand screw-threads 4. The right-hand screw-threads 3 are adapted to receive an ordinary nut 4, which is screwed up in the usual manner against the plate, bar, or other part to be held, and the outer left-hand screw-threads are of a less diameter than the right-hand screw-threads to permit the ordinary nut 4ª to be readily passed over them.

The left-hand screw-threads receive an outer left-hand nut 5, which operates as a jam-nut to prevent the inner nut 4ª from accidentally unscrewing. Although the nuts are shown polygonal in the accompanying drawings, they may be of course constructed square or any other non-circular form, and they are held together by means of a sleeve 6, extending over both of the nuts and holding them firmly together. As the nuts are reversely threaded, it will be readily apparent that it will be absolutely impossible for them to leave the bolt.

The sleeve, which is polygonal in cross-section to conform to the configuration of the nuts, is preferably constructed of copper to avoid rusting and to reduce the expansion and contraction resulting from variations in temperature to a minimum. It is locked against outward movement on the bolts by a spring-tongue 7, cut from the metal of the sleeve, extending inward and engaging a notch 8 in one of the faces of the outer nut. The notch 8 forms a shoulder at its outer end, and the resilient tongue 7, which engages said shoulder, extends toward the outer face of the outer nut and abuts squarely against the shoulder, so that it is impossible for the sleeve to slip outward accidentally and leave the nuts. The sleeve is tempered to a sufficient extent to impart the necessary resiliency to the tongue in order that the latter may firmly and positively engage the recess of the outer nut. When it is desired to remove the nuts, the tongue is lifted out of engagement with the notch by means of a knife-blade or other flat tool and the sleeve is drawn off of the nuts. The outer nut is removed by turning it to the right and the inner one by rotating it to the left.

It will be seen that the nut-lock is simple and comparatively inexpensive in construction, that it is positive and reliable in operation, and that it is capable of securely locking a nut against accidental unscrewing. It will also be apparent that the nut-lock is adapted for use on railroads, bridges, machinery, and other constructions subject to vibration, and that the nuts may be removed when desired without injuring any of the parts of the nut-lock.

What is claimed is—

In a nut-lock, the combination of a bolt provided with right and left hand screw-threads, the inner and outer right and left hand nuts arranged on the threaded portions of the bolt, the outer nut being provided with a notch forming a shoulder at its outer end, and a sleeve receiving and conforming to the configuration of both the nuts and provided with a resilient tongue formed by splitting one side of the sleeve and extending toward the outer face of the outer nut and engaging the said shoulder, whereby the sleeve is retained on the nuts and is positively locked against outward movement, substantially as described.

In testimony that we claim the foregoing as our own we have hereto affixed our signatures in the presence of two witnesses.

LEWIS E. MILNER.
DANIEL A. BECK.

Witnesses:
E. O. ALDRICH,
F. S. O'DONNEL.